United States Patent
Okumura

(10) Patent No.: US 11,478,953 B2
(45) Date of Patent: Oct. 25, 2022

(54) MANUFACTURING METHOD OF HONEYCOMB STRUCTURE AND TRANSFER PALLET

(71) Applicant: NGK Insulators, Ltd., Nagoya (JP)

(72) Inventor: Kensuke Okumura, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 660 days.

(21) Appl. No.: 16/274,484

(22) Filed: Feb. 13, 2019

(65) Prior Publication Data
US 2019/0275699 A1    Sep. 12, 2019

(30) Foreign Application Priority Data
Mar. 8, 2018    (JP) .............................. JP2018-041411

(51) Int. Cl.
*B28B 3/26*    (2006.01)
*B28B 11/16*    (2006.01)
*B29C 48/11*    (2019.01)
*B28B 3/20*    (2006.01)

(52) U.S. Cl.
CPC ............ *B28B 3/269* (2013.01); *B28B 11/161* (2013.01); *B29C 48/11* (2019.02); *B28B 2003/203* (2013.01)

(58) Field of Classification Search
None
See application file for complete search history.

(56) References Cited

U.S. PATENT DOCUMENTS

| | | | |
|---|---|---|---|
| 4,935,179 A | | 6/1990 | Kato et al. |
| 5,265,346 A | * | 11/1993 | Jikumaru .............. B28B 11/248 34/68 |
| 2004/0194427 A1 | | 10/2004 | Ishii et al. |

(Continued)

FOREIGN PATENT DOCUMENTS

| | | |
|---|---|---|
| CN | 107718236 A | 2/2018 |
| JP | S57-056112 U | 4/1982 |

(Continued)

OTHER PUBLICATIONS

Machine English Translation of JP2013121703, Accessed Aug. 24, 2021 (Year: 2013).*

(Continued)

*Primary Examiner* — Francisco W Tschen
*Assistant Examiner* — Adrianna N Konves
(74) *Attorney, Agent, or Firm* — Burr & Brown, PLLC

(57) ABSTRACT

A manufacturing method of a honeycomb structure, including a vertical extrusion process, wherein the vertical extrusion process includes: an extrusion step of extruding the molding compound in the vertically downward direction from an extrusion die attached to an extruder; a honeycomb formed body receiving step in which a transfer pallet is placed at a position near the extrusion die, and a honeycomb formed body formed by continuously extruding the molding compound in the extrusion step is received and supported from below by the transfer pallet; and a pallet lowering step of lowering the transfer pallet while receiving and supporting the honeycomb formed body in synchronization with an extrusion speed of the molding compound from the extrusion die, and the transfer pallet is constituted of a laminate structure including: a pallet substrate; and a tabular mesh plate.

8 Claims, 6 Drawing Sheets

(56) References Cited

U.S. PATENT DOCUMENTS

2004/0195719 A1  10/2004  Ishii et al.
2016/0001460 A1   1/2016  Tajima et al.

FOREIGN PATENT DOCUMENTS

| JP | S63-230304      | 9/1988  |
| JP | 2003-266420 A1  | 9/2003  |
| JP | 2003-311726 A   | 11/2003 |
| JP | 2004-001238 A1  | 1/2004  |
| JP | 2013-121703 A1  | 6/2013  |
| WO | 2014/148401 A1  | 9/2014  |

OTHER PUBLICATIONS

Japanese Office Action (Application No. 2018-041411) dated Oct. 6, 2020 (with English translation).
Chinese Office Action (Application No. 201910115586.9) dated Jul. 30, 2021.

* cited by examiner

MANUFACTURING METHOD OF HONEYCOMB STRUCTURE AND TRANSFER PALLET

The present application is an application based on JP 2018-041411 filed on Mar. 8, 2018 with Japan Patent Office, the entire contents of which are incorporated herein by reference.

BACKGROUND OF THE INVENTION

Field of the Invention

The present invention relates to a manufacturing method of a honeycomb structure and a transfer pallet. More specifically, the present invention relates to a manufacturing method of a honeycomb structure, the manufacturing method including "a vertical extrusion process" in which a molding compound (kneaded material) is extruded in a vertically downward direction (gravity direction) to form a honeycomb formed body, and a pallet for transferring a honeycomb formed body used in the vertical extrusion process.

Description of the Related Art

Hitherto, a ceramic honeycomb structure has been adopted in a variety of applications, such as a vehicle exhaust gas purifying catalyst carrier, a diesel particulate filter (DPF), a gasoline particulate filter (GPF), or a heat storage unit for combustion equipment.

A ceramic honeycomb structure (hereinafter referred to simply as "the honeycomb structure") is manufactured mainly by carrying out a molding step, in which a molding compound having an adjusted compounding ratio of each raw material components, an adjusted viscosity and the like is continuously extruded using an extruder thereby to form a round pillar-shaped or a prismatic columnar honeycomb formed body, a cutting step of cutting the obtained honeycomb formed body into a predetermined honeycomb length, a drying step of drying the honeycomb formed body, an end face finishing step of smoothing the end faces of the dried honeycomb formed body, and a firing step of firing the dried honeycomb formed body in a high-temperature firing furnace. As a result, a honeycomb structure is obtained, which has ceramic porous partition walls which extend from one end face to the other end face and which define a plurality of cells that provide fluid through channels.

In the molding process, a molding compound supplied to an extruder is extruded through an extrusion die (or die) under a predetermined pressure, thereby forming a honeycomb formed body. In this case, generally, the extrusion direction is set to coincide with the horizontal direction, and the molding compound (the honeycomb formed body) is extruded in a lateral direction.

A honeycomb structure manufactured as an end product is used, in some cases, to purify an exhaust gas or the like in a general vehicle and also in large machinery, such as a large vehicle, a construction machine, or a vessel. Hence, there have been some cases where a large-sized honeycomb structure having a large honeycomb diameter and the like is required to be compatible with the foregoing large machinery or the like.

However, when an attempt was made to form a large-sized honeycomb formed body by adopting the standard molding process as described above and by setting the extrusion direction to coincide with the horizontal direction (the lateral direction), there has been a possibility of a problem, such as the cells of a honeycomb formed body extruded from an extrusion die being crushed or the end faces thereof being deformed due to its own weight.

In order to solve such a problem, the "vertical extrusion process," in which a molding compound is extruded in the vertically downward direction (gravity direction), is performed in some cases in the molding process for manufacturing a large-sized honeycomb structure (refer to, for example, Patent Documents 1 to 3). Thus, compared with the case where a molding compound is extruded in the lateral direction, the problem, such as an extruded honeycomb formed body being deformed due to its own weight or the like, can be solved. This makes it possible to form a large-sized honeycomb formed body that has high dimensional stability and therefore to obtain a large-sized honeycomb structure.

In the vertical extrusion process, a honeycomb formed body 100 which has been formed by being extruded in the vertically downward direction from an extruder is received and supported by a transfer pallet 101 provided below the extruder. Then, the honeycomb formed body 100 placed on the transfer pallet 101 will be sent to the next step, such as a drying step. FIG. 5 schematically shows the honeycomb formed body 100 that has been extruded and cut to a predetermined honeycomb length and the configuration of the transfer pallet 101.

The transfer pallet 101 frequently has a dual structure (laminate structure) constituted of a pallet substrate 102 composed of, for example, a plate-like member made of a metal (aluminum or the like), and a plate-like punched plate 103 which is placed on the pallet substrate 102 in an overlapping manner and which has a plurality of punched holes 103a, as shown in FIG. 5 and FIG. 6.

As shown in FIG. 5, the pallet substrate 102 may have a grid-like structure combining a plurality of frames or may be a standard plate member. Further, the drying step carried out as the next step adopts a drying method mainly based on dielectric heating. Therefore, as with the pallet substrate 102, the punched plate 103 itself is preferably made of a conductive material, such as aluminum, so as to prevent the occurrence of a discharge phenomenon between the transfer pallet 101 and the honeycomb formed body.

[Patent Document 1] JP-A-63-230304
[Patent Document 2] JP-A-2003-311726
[Patent Document 3] WO 2014/148401

SUMMARY OF THE INVENTION

However, there has been a possibility that forming a honeycomb formed body by adopting the foregoing vertical extrusion process presents a problem described below. This has led to a possibility of affecting the performance of a honeycomb structure, which will be an end product.

More specifically, the honeycomb formed body 100 formed by the vertical extrusion process includes partition walls 106 that define a plurality of cells 105 which extend from one end face 104a to the other end face 104b and which provide the through channels of a fluid (refer to FIG. 5). The size of each of the cells 105 defined by the partition walls 106 is extremely small. In contrast, the width of a connection portion 103b between a punched hole 103a of the punched plate 103, which comes in contact with the end face on the bottom side of the honeycomb formed body 100 (the other end face 104b in FIG. 5) and supports the honeycomb formed body 100 from below, and another punched hole 103a which are adjacent to each other is larger than the size of the cell 105 in some cases.

Hence, when the honeycomb formed body 100 is placed on the punched plate 103, there is a likelihood that some of the cells 105 are positioned over the connection portions 103b of the punched plate 103 (refer to FIG. 6). In other words, some cells 105 adjacent to the other end face 104b of the honeycomb formed body 100 are covered by the connection portions 103b (refer to a blocked region H in FIG. 6). FIG. 6 is a sectional view of the honeycomb formed body 100 that has been cut along the vertical direction from the center of the end face of the honeycomb formed body 100, and is an enlarged reference diagram schematically showing the positional relationship between the punched holes 103a of the punched plate 103 and the connection portions 103b.

A molding compound is continuously extruded from above by an extruder, so that, if the ends of the cells 105 on the other end face 104b side are blocked, as in the blocked region H shown in FIG. 6, then the passage of air (fluid) inside the cells 105 is blocked, leading to the occurrence of a difference in pressure between the spaces inside the cells 105 and the outside. This has been leading, in some cases, to a problem in which, for example, the partition walls 106 are deformed and the widths of the cells 105 are narrowed or the cells 105 are completely crushed by the deformed partition walls 106. As a result, the flow of a fluid (not shown) passing through the interior of the manufactured honeycomb structure is disturbed, leading to a possibility of the deterioration of various types of performance and effects, such as the purifying performance of the honeycomb structure.

Accordingly, the present invention has been made with the background described above, and an object of the invention is to provide a manufacturing method of a honeycomb structure that makes it possible to prevent the blockage and deformation or the like of the cells of a honeycomb formed body attributed to the use of a transfer pallet in a vertical extrusion process, thereby enabling the manufacture of a honeycomb structure featuring high dimensional stability, and a transfer pallet used for the vertical extrusion process.

According to the present invention, the manufacturing method of a honeycomb structure and a transfer pallet described below are provided.

(1) A manufacturing method of a honeycomb structure, including a vertical extrusion process for forming a honeycomb formed body by extruding a molding compound in a vertically downward direction, wherein the vertical extrusion process includes: an extrusion step of extruding the molding compound in the vertically downward direction from an extrusion die attached to an extruder; a honeycomb formed body receiving step in which a transfer pallet is placed at a position near the extrusion die and a honeycomb formed body formed by the molding compound continuously extruded in the extrusion step is received and supported from below by the transfer pallet; and a pallet lowering step of lowering the transfer pallet in synchronization with an extrusion speed of the molding compound from the extrusion die while receiving and supporting the honeycomb formed body, and the transfer pallet is constituted of a laminate structure including: a pallet substrate; and a tabular mesh plate which is placed on the pallet substrate in an overlapping manner and which is formed of a mesh material having a plurality of mesh holes.

(2) The manufacturing method of a honeycomb structure according to the foregoing (1), wherein the transfer pallet further includes a tabular punched plate which is provided in an inserted manner between the pallet substrate and the mesh plate and which has a plurality of punched holes drilled at predetermined intervals.

(3) The manufacturing method of a honeycomb structure according to the foregoing (1) or (2), wherein the number of meshes per inch of the mesh plate ranges from 30 to 100.

(4) The manufacturing method of a honeycomb structure according to any of the foregoing (1) or (3), wherein the transfer pallet further includes a single or a plurality of tabular intermediate mesh plates which are provided under the mesh plate in an overlapping manner and which are formed of a mesh material having a plurality of mesh holes.

(5) The manufacturing method of a honeycomb structure according to the foregoing (4), wherein the intermediate mesh plate has the number of meshes per inch ranging from 16 to 80, and in the case where the number of meshes per inch is the same as or smaller than that of the mesh plate and a plurality of stacked intermediate mesh plates are provided, the number of meshes per inch of the intermediate mesh plate at a lower stage position is the same as or smaller than that of an intermediate mesh plate at an upper stage position.

(6) The manufacturing method of a honeycomb structure according to the foregoing (4) or (5), wherein all of or at least one of the pallet substrate, the mesh plate, the punched plate, and the intermediate mesh plate is constituted of a conductive material.

(7) A transfer pallet used in the manufacturing method of a honeycomb structure according to any of the foregoing (1) to (6), including a pallet substrate and a tabular mesh plate which is placed on the pallet substrate in an overlapping manner and which is constituted of a mesh material having a plurality of mesh holes.

(8) The transfer pallet according to the foregoing (7), further including a tabular punched plate which is provided in an inserted manner between the pallet substrate and the mesh plate and which has a plurality of punched holes drilled at predetermined intervals.

(9) The transfer pallet according to the foregoing (7) or (8), wherein the number of meshes per inch of the mesh plate ranges from 30 to 100.

(10) The transfer pallet according to any one of the foregoing (7) to (9), further including a single or a plurality of tabular intermediate mesh plates which are provided under the mesh plate in an overlapping manner and which are formed of a mesh material having a plurality of mesh holes.

(11) The transfer pallet according to the foregoing (10), wherein the intermediate mesh plate has the number of meshes per inch ranging from 16 to 80, and in the case where the number of meshes per inch is the same as or smaller than that of the mesh plate and a plurality of intermediate mesh plates are provided, the number of meshes per inch of the intermediate mesh plate at a lower stage position is the same as or smaller than that of an intermediate mesh plate at an upper stage position.

(12) The transfer pallet according to the foregoing (10) or (11), wherein all of or at least one of the pallet substrate, the mesh plate, the punched plate, and the intermediate mesh plate is constituted of a conductive material.

The manufacturing method of a honeycomb structure in accordance with the present invention makes it possible to suppress the occurrence of a defect at the time of vertical extrusion, thus enabling the manufacture of a honeycomb structure having high shape stability. Further, the transfer pallet in accordance with the present invention makes it possible to receive a honeycomb formed body immediately after being extruded by vertical extrusion and to carry the honeycomb formed body to a next step while supporting the honeycomb formed body without causing the occurrence of a defect, such as the deformation of a cell.

DESCRIPTION OF THE PREFERRED EMBODIMENTS

With reference to the accompanying drawings, the following will describe the manufacturing method of a honeycomb structure in accordance with the present invention and the embodiments of a transfer pallet used in the manufacturing method of the honeycomb structure. The manufacturing method of a honeycomb structure and the transfer pallet in accordance with the present invention are not limited to the embodiments described below, and can be changed, modified, improved or the like within the scope of the present invention.

As mainly shown in FIG. 1, a manufacturing method 1 of a honeycomb structure, which is an embodiment of the present invention (hereinafter referred to simply as "the manufacturing method 1"), includes a vertical extrusion process S1, which is a type of a molding process of extruding a molding compound K, which has the viscosity and the like thereof adjusted beforehand, by an extruder 2 for vertical extrusion to form a honeycomb formed body 3.

Figure 1:
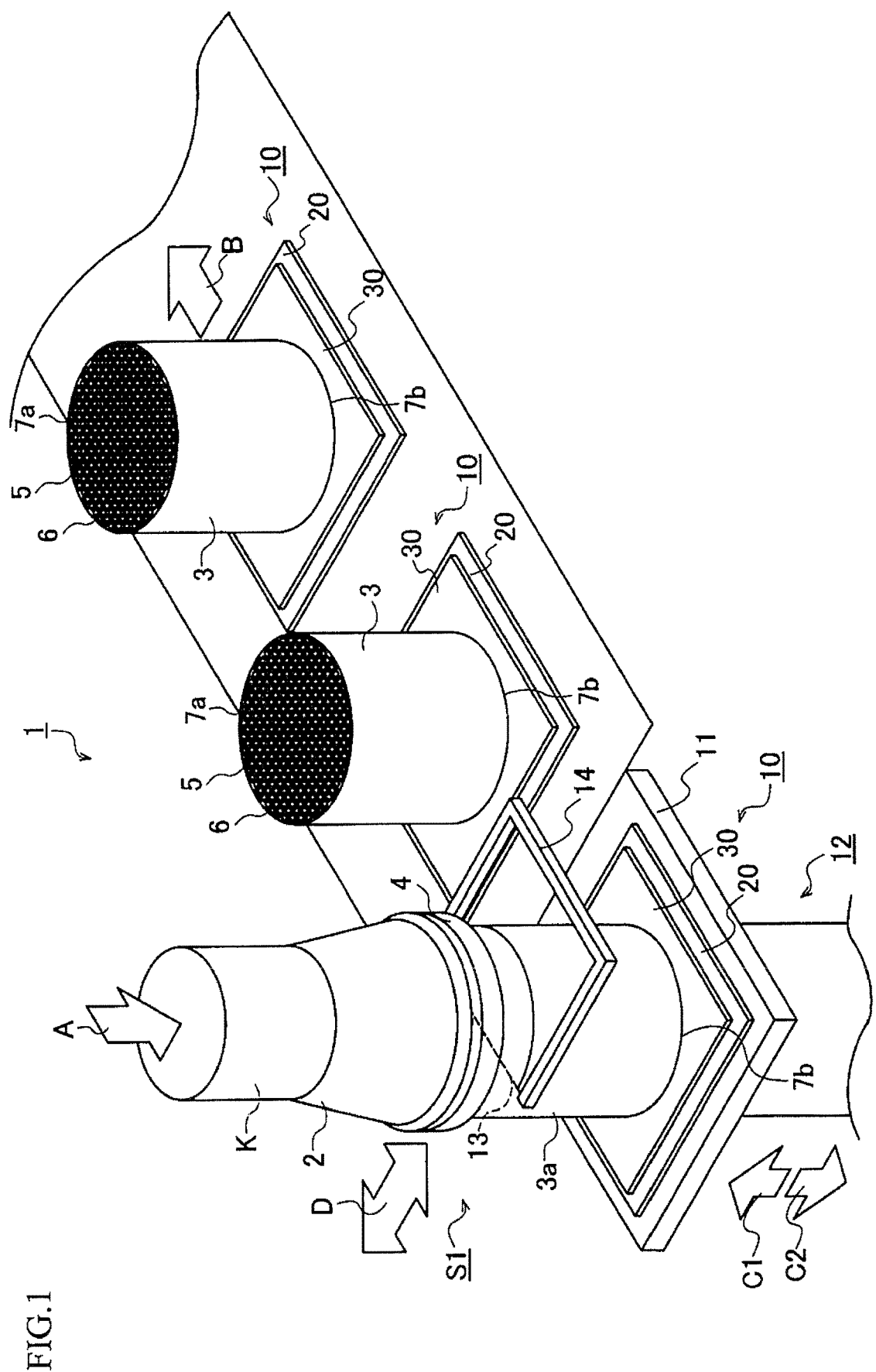
FIG. 1 is an explanatory diagram schematically showing an example a vertical extrusion process and the transfer to a next step in the manufacturing method of a honeycomb structure according to an embodiment of the present invention.

As shown in FIG. 1, the vertical extrusion process S1 in the manufacturing method 1 according to the present embodiment primarily includes: an extrusion step of extruding a molding compound K in a vertically downward direction A (gravity direction) from the extruder 2, into which the molding compound K has been supplied; a honeycomb formed body receiving step in which a transfer pallet 10 is placed near an extrusion die 4 (die) attached to the extruder 2 and an uncut honeycomb formed body 3a, which has been formed by the molding compound K continuously extruded and which is connected with the extrusion die 4, is received and supported by the transfer pallet 10; and a pallet lowering step in which the transfer pallet 10 that has received the uncut honeycomb formed body 3a is gradually lowered in synchronization with the extrusion speed of the molding compound K while supporting the uncut honeycomb formed body 3a so as to form a honeycomb formed body 3 of a predetermined honeycomb length. The transfer pallet 10 is shown in a simplified manner in FIG. 1.

Further, the manufacturing method 1 according to the present embodiment primarily includes: a cutting step of cutting the honeycomb formed body 3a formed in the vertical extrusion process S1 into the honeycomb formed body 3 of the predetermined honeycomb length; and a transfer step of transferring, along a horizontal direction (transfer direction B), the cut honeycomb formed body 3 placed on the transfer pallet 10 to a drying furnace (not shown) in which the drying step is carried out.

The vertical extrusion process S1 uses, in addition to the configurations of the extruder 2 and the transfer pallet 10 described above, other configurations, such as a pallet lifting mechanism 12 having a function for placing the transfer pallet 10 on a lifting platform 11 and raising the lifting platform 11 to a position near the extrusion die 4 of the extruder 2 (refer to a raising direction C1 in FIG. 1) and a function for gradually lowering the lifting platform 11 with the transfer pallet 10 placed thereon (refer to a lowering direction C2 in FIG. 1) according to the extrusion speed of the molding compound K in the vertically downward direction A, and a wire cutting unit 14 for moving a wire cutter 13 along a cutting direction D, which coincides with the horizontal direction, with respect to the uncut honeycomb formed body 3a in a state in which the transfer pallet 10 has been lowered to a lowering position specified in advance so as to form a honeycomb formed body 3 of a predetermined honeycomb length.

The lowering direction C2 of the transfer pallet 10 and the lifting platform 11 coincides with the vertically downward direction A in which the molding compound K is extruded. The configurations related to the pallet lifting mechanism 12 and the wire cutting unit 14 are well-known and used in a conventional vertical extrusion process, so that the detailed description thereof will be omitted herein.

Figure 2:
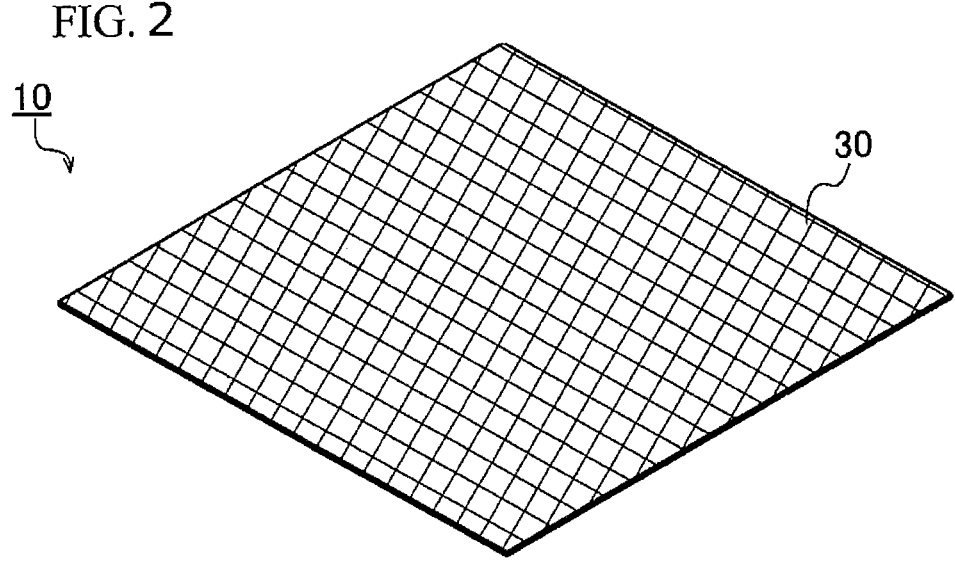
FIG. 2 is an exploded perspective view showing the configuration of a transfer pallet according to an embodiment of the present invention.
Figure 2:
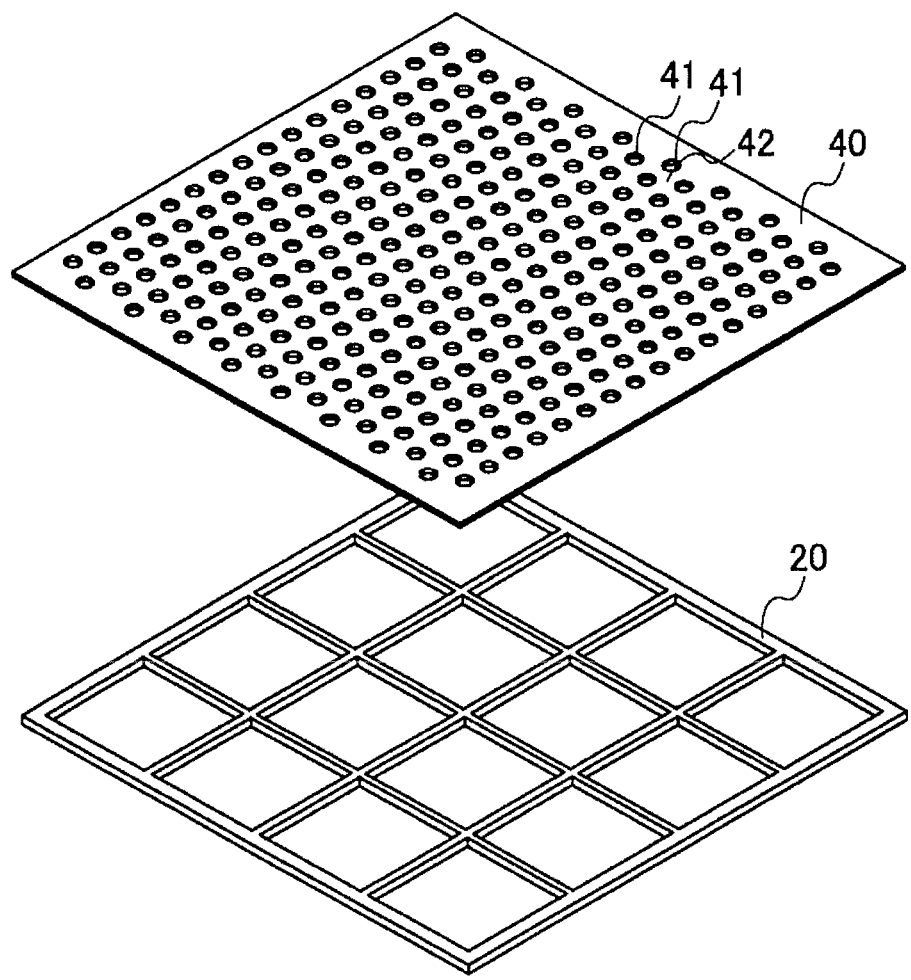

As shown in FIG. 2, the transfer pallet 10 according to an embodiment of the present invention is primarily constituted of a tabular pallet substrate 20 formed by stacking a plurality of frames in a grid-like pattern, and a tabular mesh plate 30 which is placed on the pallet substrate 20 and which is formed of a mesh material having a plurality of mesh holes. The transfer pallet 10 used in the manufacturing method 1 according to the present embodiment includes, in addition to the foregoing configurations, a tabular punched plate 40 which is provided in an inserted manner between the pallet substrate 20 and the mesh plate 30, which has a plurality of punched holes 41 drilled at predetermined intervals and which has connection portions 42 between the punched holes 41 that are adjacent to each other. In other words, the transfer pallet 10 according to the present embodiment has a three-layer structure constituted of the three tabular members, namely, the pallet substrate 20, the punched plate 40, and the mesh plate 30.

In the transfer pallet 10 according to the present embodiment, each of the pallet substrate 20, the mesh plate 30, and the punched plate 40 is constituted using aluminum as the material thereof. The pallet substrate 20 and the like constituting the transfer pallet 10 are not limited to those using the aluminum as the material, and other metal materials, such as stainless steel or iron, can be used.

The drying step carried out after the vertical extrusion process mainly adopts the dielectric heating and drying method in many cases. Hence, using a nonconductive, nonmetal material as the material for constituting the transfer pallet leads, in some cases, to the occurrence of uneven drying distribution of the honeycomb formed body 3 or other defects, such as partial burn-damage, due to the discharge phenomenon that takes place during the drying step. Further, a local high temperature may cause uneven drying shrinkage when drying the honeycomb formed body, resulting in the deformation of the honeycomb formed body after being dried. Therefore, a metal material, such as aluminum mentioned above, i.e. a conductive material, is preferably used for the transfer pallet. In the case where a drying step that does not use the dielectric heating and drying method is carried out, a resin material (nonconductive material), such as an aramid resin, may be used to constitute the pallet substrate and the like rather than limiting the material to those mentioned above.

Figure 3:
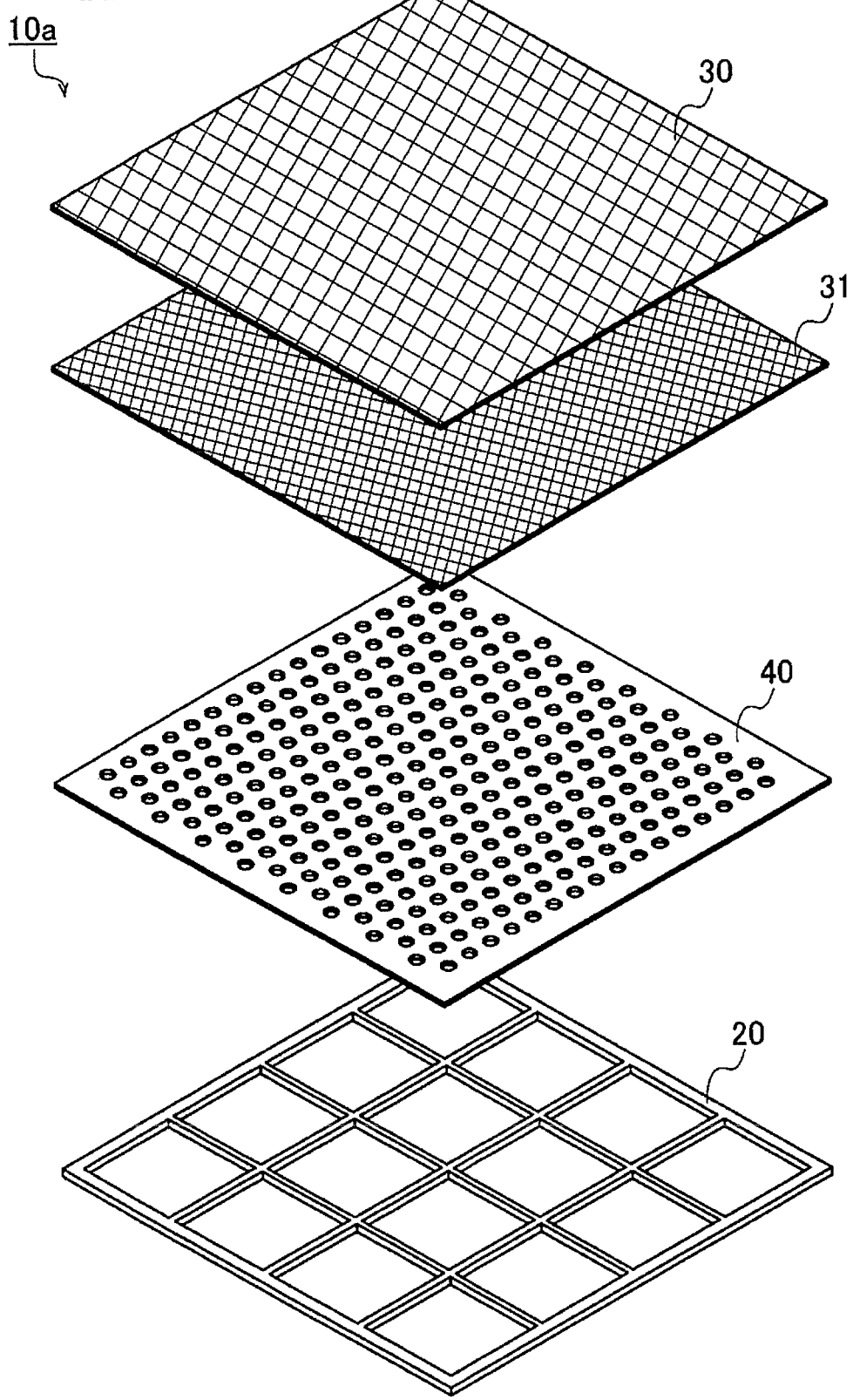
FIG. 3 is an exploded perspective view showing another example of the configuration of the transfer pallet in accordance with the present invention.

Further, the transfer pallet 10 according to the present invention is not limited to the three-layer structure shown in FIG. 2. For example, a transfer pallet may have a two-layer structure (not shown) constituted of the pallet substrate 20 and the mesh plate 30 by omitting the configuration of the punched plate 40, or may further include an intermediate mesh plate 31 provided under the mesh plate 30, as shown in FIG. 3.

The intermediate mesh plate 31 is a tabular member formed of a mesh material having a plurality of mesh holes and has substantially the same configuration as that of the mesh plate 30 positioned at the topmost stage of the transfer pallet 10. In other words, the transfer pallet 10 may be a transfer pallet 10a having a four-layer structure that further includes the intermediate mesh plate 31. The number of the intermediate mesh plates 31 provided in an inserted manner between the mesh plate 30 and the punched plate 40 is not limited to one, and a plurality of intermediate mesh plates 31 may be provided in an inserted manner to constitute a transfer pallet having a multi-layer structure. In the following description, the transfer pallet 10a having the four-layer structure will be used.

Figure 4:
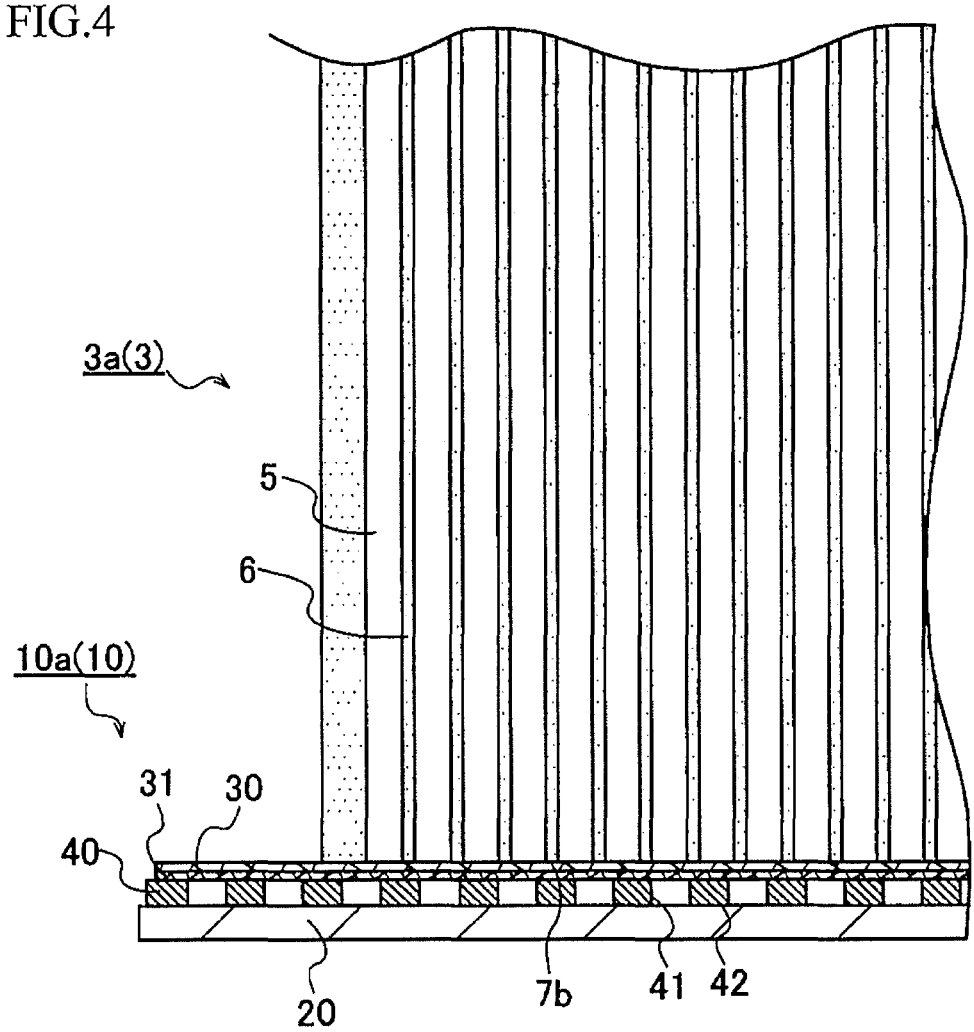
FIG. 4 is a partly enlarged sectional view schematically showing the configurations of a transfer pallet and a honeycomb formed body placed on the transfer pallet.
Figure 5:
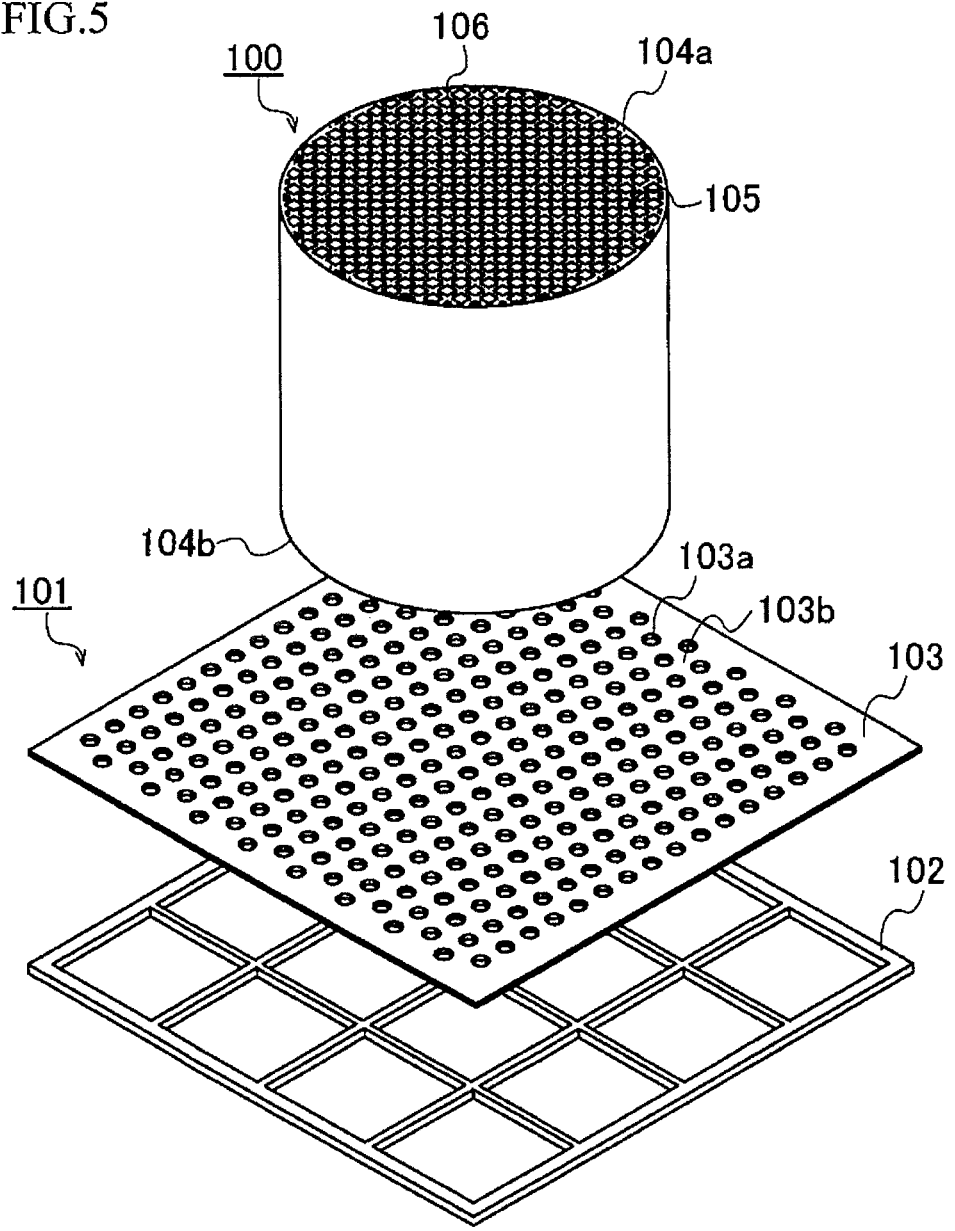
FIG. 5 is an exploded perspective view showing the configurations of a conventional transfer pallet and a honeycomb formed body to be placed on the transfer pallet.
Figure 6:
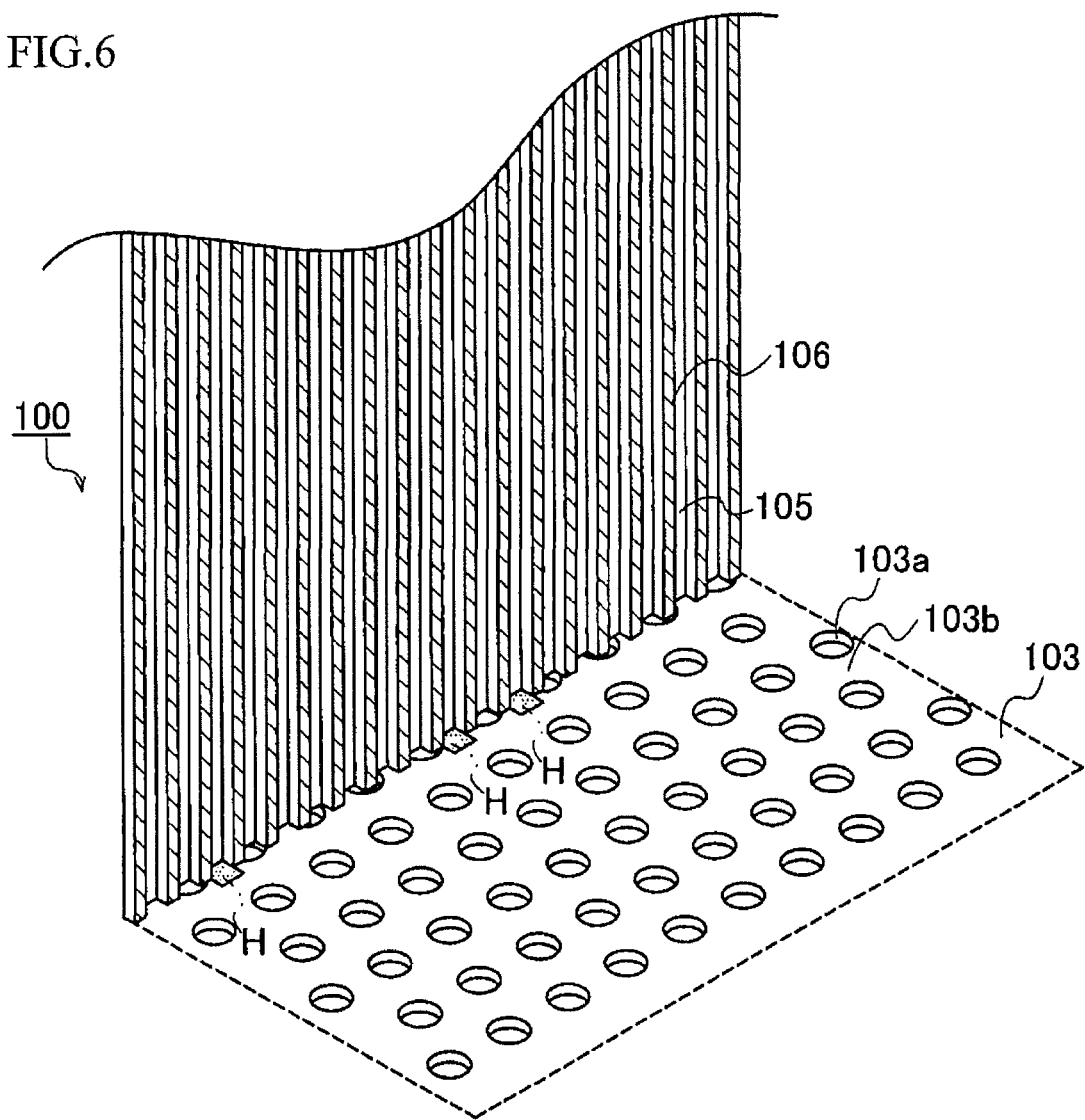
FIG. 6 is an enlarged reference perspective view schematically showing blocked cells of a honeycomb formed body on a conventional transfer plate.

The transfer pallet 10a described above includes partition walls 6 that define a plurality of cells 5 which provide fluid through channels and which extend from one end face 7a to the other end face 7b, and receives and supports from below an uncut honeycomb formed body 3a immediately after extruded from an extruder. At this time, the end face of the received uncut honeycomb formed body 3a (the end face corresponding to the other end face 7b in this case) and the upper face of the mesh plate 30 positioned at the topmost stage of the transfer pallet 10a come in contact (refer to FIG. 4).

As a result, the cells 5 at the other end face 7b of the uncut honeycomb formed body 3a will not be blocked. More specifically, the mesh holes of the mesh plate 30 secure the through channels, through which air flows, between the spaces inside the cells 5 and the outside. Therefore, even when the molding compound K is continuously extruded from above, the spaces inside the cells 5 will not develop a decompressed state, thus preventing a problem, such as the partition walls 6 being deformed or the cells 5 being crushed.

As described above, in order to secure the flow of air, the size of the mesh holes of the mesh plate 30 is important. In the case of the mesh material, the number of meshes per inch (the number of mesh holes) generally defines the roughness or fineness of mesh. The number of meshes per inch of the mesh plate 30 used in the transfer pallet 10 according to the present embodiment can be set to a range of 30 to 100.

If a mesh plate having a small number of meshes, namely, below 30, i.e. having large-sized mesh holes, is used, then the diameter of the wire that forms the mesh holes will be larger, as with the punched plate described above, so that some of the cells 5 of the uncut honeycomb formed body 3a will be blocked by the wire of the mesh plate, leading to the decompressed state inside the cells 5. Thus, the problem with the dimensional stability cannot be solved.

Meanwhile, if a mesh plate having a large number of meshes, namely, over 100, i.e. having small-sized mesh holes, is used, then there will be problems, such as the circulation (ventilation) of air flow between the spaces inside the cells 5 and the outside being highly likely to be impaired, and further, the occurrence of the discharge phenomenon in the heating step that uses the dielectric heating and drying method. Therefore, the transfer pallet 10a according to the present embodiment uses the mesh plate 30 using a mesh material, the number of meshes per inch of which is within the foregoing specified range.

Meanwhile, as the intermediate mesh plate 31 provided under the mesh plate 30, an intermediate mesh plate, the number of meshes per inch of which is within the range of 16 to 80, is used. Further, an intermediate mesh plate that has the same number of meshes as or a smaller number of meshes than the number of meshes of the mesh plate 30 positioned at the topmost position of the transfer pallet 10 of the multilayer structure is selected as the intermediate mesh plate 31.

For example, if the number of meshes of the mesh plate 30 is "30", then an intermediate mesh plate, the number of meshes of which is "16", can be selected as the intermediate mesh plate 31 placed under the mesh plate 30. The intermediate mesh plate 31 does not come in direct contact with the other end face 7b of the uncut honeycomb formed body 3a. Hence, even if the diameter of the foregoing wire is increased, the cells 5 will not be blocked. Therefore, the intermediate mesh plate 31 constituted of a mesh material having large mesh holes can be adopted in order to obtain good ventilation with the spaces inside the cells 5. The mesh plate 30 and the intermediate mesh plate 31 may have the same number of meshes. However, if the number of meshes of the intermediate mesh plate 31 is set to be larger than that of the mesh plate 30, then the ventilation with the outside would be impaired, so that such an intermediate mesh plate cannot be adopted for the transfer pallet of the present invention.

Further, in the case where a plurality of intermediate mesh plates 31 are stacked and placed between the mesh plate 30 and the punched plate 40 (or the pallet substrate 20), the number of meshes of the intermediate mesh plate 31 positioned at a lower stage than the intermediate mesh plate 31 positioned at a higher stage must be also set to be the same or smaller. This is because of the same reason as that for the mesh plate 30 and the intermediate mesh plate 31 described above.

Thus, using the transfer pallet 10 or 10a which has the multilayer structure (the laminate structure) including three layers or four layers and which has, at the topmost stage, the mesh plate 30 constituted of the specified number of meshes will prevent the cells 5 of the uncut honeycomb formed body 3a received by the transfer pallet 10 or the like from being blocked and also prevent the spaces inside the cells 5 from being decompressed. As a result, the problems, such as the crushing or deformation of the cells or partition walls that occur in the conventional transfer pallet in which the punched plate is positioned at the topmost stage, will not occur.

In other words, the manufacturing method 1 and the transfer pallets 10 or 10a used in the manufacturing method 1 according to the present embodiment make it possible to maintain high shape stability even for the vertical extrusion when forming a large honeycomb formed body having a large honeycomb diameter or a large honeycomb length, thus enabling the manufacture of a honeycomb structure with high dimensional stability free of cell deformation. This enables the flow of a fluid flowing inside the honeycomb structure to be stabilized, so that a honeycomb structure that exhibits outstanding effect of purifying performance and the like can be achieved.

EXAMPLES

The following will describe the manufacturing method of a honeycomb structure and a transfer pallet in accordance with the present invention with reference to the following examples; however, the manufacturing method in accordance with the present invention is not limited to the examples.

(1) Manufacturing a Honeycomb Structure by Vertical Extrusion In order to check the influences of the deformation or the like of the cells of a honeycomb structure attributed to a transfer pallet in accordance with the present invention, honeycomb structures were manufactured by vertical extrusion process by using a plurality of transfer pallets fabricated under the conditions of Examples 1 to 8 and Comparative example 1. The molding compounds used, the basic conditions of extrusion by an extruder, and the processing, such as drying and firing, of a honeycomb formed body were the same unless otherwise specified. Examples 1 to 8 and Comparative example 1 were manufactured under different conditions, including the honeycomb diameter and the honeycomb length of a honeycomb structure to be manufactured, the product weight of the honeycomb structure, and the configuration of a transfer pallet (with or without a punched plate, with or without a mesh plate, the number of meshes, and with or without an intermediate mesh plate). Further, the same pallet substrate and the same punched plate were used for the transfer pallet.

Example 1 is a honeycomb structure which was manufactured by the vertical extrusion, using a transfer pallet that has a three-layer structure constituted of a pallet substrate, a punched plate, and a mesh plate (the number of meshes being 30) and which has a cell density of 300 cpsi, a honeycomb diameter of 320 mm, a honeycomb length of 550 mm, and a product weight of approximately 35000 g. Example 2 is a honeycomb structure which was manufactured under substantially the same conditions as those of Example 1 and which has a product weight of approximately 33000 g. The meshes (the numbers of meshes) were measured according to the measurement method of "11.2 Mesh" of JIS G3555 (2004) (The same will apply hereinafter).

Example 3 is a honeycomb structure which was manufactured by the vertical extrusion, using an intermediate mesh plate (the number of meshes being 16) provided under a mesh plate (the number of meshes being 30) and using a transfer pallet of a four-layer structure including a pallet substrate and a punched plate, and which has a cell density of 600 cpsi, a honeycomb diameter of 380 mm, a honeycomb length of 400 mm, and a product weight of approximately 17000 g. Example 4 is a honeycomb structure which was manufactured by using the same transfer pallet as that in Examples 1 and 2 and which has a honeycomb diameter of 320 mm, a honeycomb length of 300 mm, and a product weight of approximately 8700 g.

Example 5 is a honeycomb structure which was manufactured by the vertical extrusion, using a transfer pallet of a two-layer structure having a pallet substrate and a mesh plate (the number of meshes being 30), and which has a cell density of 600 cpsi, a honeycomb diameter of 380 mm, and a honeycomb length of 400 mm. Example 6 was manufactured as a honeycomb structure that is the same as the honeycomb structure of Example 5 and was manufactured by the vertical extrusion, using a transfer pallet of a three-layer structure constituted of a pallet substrate, a punched plate, and a mesh plate (the number of meshes being 80). All of Examples 1 to 6 satisfy the requirements specified in the manufacturing method and the transfer pallet in accordance with the present invention.

Example 7 deviates from the requirements specified in the present invention in that a mesh plate having 16 meshes is used under substantially the same conditions as those of Example 6, and Example 8 deviates from the requirements specified in the present invention in that a mesh plate having 120 meshes is used. Comparative example 1 is a honeycomb structure manufactured, using a conventional transfer pallet having a two-layer structure constituted of a pallet substrate and a punched plate.

(2) Evaluation

The honeycomb structures manufactured as Examples 1 to 8 and Comparative example 1 were visually checked for defects, such as the presence of crushed cells or partition walls, and burn-damage from drying, and the evaluation results were indicated by "good," "acceptable," and "poor." Regarding Examples 1 to 8 and Comparative example 1, Table 1 shows the specifications of the manufactured honeycomb structures, the configuration of the transfer pallet, and the evaluation results.

TABLE 1

| | Partition | | | | | | Mesh Plate (Intermediate Mesh Plate) | | | |
| --- | --- | --- | --- | --- | --- | --- | --- | --- | --- | --- |
| | Cell Density cpsi | Wall Thickness μm | Honeycomb Diameter mm | Honeycomb Length mm | Weight g | Punched Plate | Q'ty | Q'ty of Meshes Q'ty/inch | Wire Diameter mm | Evaluation |
| Example 1 | 300 | 320 | 380 | 550 | 34662 | With | 1 | 30 | 0.5 | Good |
| Example 2 | 300 | 320 | 380 | 550 | 33263 | With | 1 | 30 | 0.5 | Good |
| Example 3 | 600 | 100 | 380 | 400 | 17385 | With | 2 | Mesh: 30/ Intermediate: 16 | Mesh: 0.5/ Intermediate: 0.29 | Good |
| Example 4 | 600 | 80 | 320 | 300 | 8672 | With | 1 | 30 | 0.5 | Good |
| Example 5 | 600 | 100 | 380 | 400 | 17194 | Without | 1 | 30 | 0.5 | Good |
| Example 6 | 600 | 100 | 380 | 400 | 17194 | With | 1 | 80 | 0.29 | Good |

TABLE 1-continued

| | Partition | | | | | | Mesh Plate (Intermediate Mesh Plate) | | | |
|---|---|---|---|---|---|---|---|---|---|---|
| | Cell Density cpsi | Wall Thickness μm | Honeycomb Diameter mm | Honeycomb Length mm | Weight g | Punched Plate | Q'ty | Q'ty of Meshes Q'ty/inch | Wire Diameter mm | Evaluation |
| Example 7 | 600 | 100 | 380 | 400 | 17194 | With | 1 | 16 | 0.29 | Acceptable |
| Example 8 | 300 | 100 | 380 | 400 | 17352 | With | 1 | 120 | 0.08 | Acceptable |
| Comparative Example 1 | 300 | 100 | 380 | 400 | 17220 | With | 0 | — | — | Poor |

As is shown in Table 1, it has been verified that all of Examples 1 to 6 having the mesh plate at the topmost stage in contrast to the conventional transfer pallet without a mesh plate (Comparative example 1) are capable of providing honeycomb structures that have high dimensional stability free of crushed or deformed cells or other defects without the occurrence of the blocking of the cells at the time of extrusion. Further, as shown in Example 7 and Example 8, it has been verified that, if the number of meshes of the mesh plate is below 30 or over 100, the evaluation in both cases is lower in some degree than Examples 1 to 6, but are still evaluated as "Acceptable," which means that they are adequate for practical usage. In other words, it has been verified that using a mesh plate, the number of meshes of which is in the range of 30 to 100 as specified in the present invention, is especially suitable.

In addition, as shown by Example 3, the high evaluation was obtained in the case where the intermediate mesh plate is further provided under the mesh plate, and it has been verified that the number of meshes of the intermediate mesh plate may be smaller than that of the mesh plate. Further, as shown by Example 5, the good result was obtained even with the transfer pallet having the two-layer structure which is constituted of the pallet substrate and the mesh plate and which does not include a punched plate.

The manufacturing method of a honeycomb structure in accordance with the present invention can be suitably used for the manufacture of a large honeycomb structure, which includes a vertical extrusion process. Further, the transfer pallet in accordance with the present invention can be suitably used for receiving and supporting a honeycomb formed body in the foregoing vertical extrusion process.

DESCRIPTION OF REFERENCE NUMERALS

1: manufacturing method (manufacturing method of a honeycomb structure); 2: extruder; 3, 100: honeycomb formed body; 3a: uncut honeycomb formed body; 4: extrusion die; 5, 105: cell; 6, 106: partition wall; 7a, 104a: one end face; 7b, 104b: other end face; 10, 10a: transfer pallet; 20, 102: pallet substrate; 30: mesh plate; 31: intermediate mesh plate; 40, 103: punched plate; 41, 103a: punched hole; 42, 103b: connection portion; A: vertically downward direction; B: transfer direction; C1: raising direction; C2: lowering direction; D: cutting direction; K: molding compound; H: blocked region; and S1: vertical extrusion process.

What is claimed is:

1. A manufacturing method of a honeycomb structure, comprising a vertical extrusion process for forming a honeycomb formed body by extruding a molding compound in a vertically downward direction, wherein the vertical extrusion process comprises:

an extrusion step of extruding the molding compound in the vertically downward direction from an extrusion die attached to an extruder;

a honeycomb formed body receiving step in which a transfer pallet is placed at a position near the extrusion die, and the honeycomb formed body formed by continuously extruding the molding compound in the extrusion step is received and supported from below by the transfer pallet; and a pallet lowering step of lowering the transfer pallet while receiving and supporting the honeycomb formed body in synchronization with an extrusion speed of the molding compound from the extrusion die, wherein the transfer pallet is a laminate structure including at least three layers and comprises a pallet substrate, a tabular mesh plate, placed on the pallet substrate in an overlapping manner, and formed of a mesh material having a plurality of mesh holes, a tabular punched plate, inserted between the pallet substrate and the mesh plate, and having a plurality of punched holes drilled at predetermined intervals, and a single tabular intermediate mesh plate, or a plurality of tabular intermediate mesh plates, provided under the mesh plate in an overlapping manner and which are formed of a mesh material having a plurality of mesh holes, wherein a number of mesh holes per inch of the intermediate mesh plate at a lower stage position is smaller than those of the mesh plate and of the intermediate mesh plate at an upper stage position, and wherein a bottom surface of the extruded honeycomb structure directly contacts the tabular mesh plate of the transfer pallet.

2. The manufacturing method of a honeycomb structure according to claim 1, wherein the number of mesh holes per inch of the mesh plate is in a range of 30 to 100.

3. The manufacturing method of a honeycomb structure according to claim 1, wherein the number of mesh holes per inch of the intermediate mesh plate is in a range of 16 to 80.

4. The manufacturing method of a honeycomb structure according to claim 1, wherein each of, or at least one of, the pallet substrate, the mesh plate, the punched plate, and the intermediate mesh plate is a conductive material.

5. A transfer pallet for use in a method of manufacturing a honeycomb structure, the transfer pallet having at least a three-layer structure comprising:

a pallet substrate;

a tabular mesh plate, placed on the pallet substrate in an overlapping manner, and which is formed of a mesh material having a plurality of mesh holes;

a tabular punched plate, inserted between the pallet substrate and the mesh plate, and having a plurality of punched holes drilled at predetermined intervals; and a single tabular intermediate mesh plate, or a plurality of tabular intermediate mesh plates, provided under the mesh plate in an overlapping manner and which are formed of a mesh material having a plurality of mesh holes, wherein a number of mesh holes per inch of the intermediate mesh plate at a lower stage position is smaller than those of the mesh plate and of the intermediate mesh plate at an upper stage position, and wherein a bottom surface of an extruded honeycomb structure directly contacts the tabular mesh plate of the transfer pallet.

6. The transfer pallet according to claim 5, wherein a number of meshes per inch of the mesh plate is in a range of 30 to 100.

7. The transfer pallet according to claim 5, wherein the number of mesh holes per inch of the intermediate mesh plates is in a range of 16 to 80.

8. The transfer pallet according to claim 5, wherein each of, or at least one of, the pallet substrate, the mesh plate, the punched plate, and the intermediate mesh plate is a conductive material.

* * * * *